(12) United States Patent
Kimura

(10) Patent No.: US 9,260,112 B2
(45) Date of Patent: Feb. 16, 2016

(54) CONTROL APPARATUS FOR A HYBRID VEHICLE DRIVE SYSTEM

(71) Applicant: TOYOTA JIDOSHA KABUSHIKI KAISHA, Toyota-shi, Aichi (JP)

(72) Inventor: Shigeru Kimura, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/635,463

(22) Filed: Mar. 2, 2015

(65) Prior Publication Data

US 2015/0258985 A1    Sep. 17, 2015

(30) Foreign Application Priority Data

Mar. 14, 2014  (JP) .................. 2014-052644

(51) Int. Cl.

| | |
|---|---|
| *B60L 11/00* | (2006.01) |
| *B60W 20/00* | (2006.01) |
| *F02N 11/08* | (2006.01) |
| *B60W 30/18* | (2012.01) |
| *B60K 6/445* | (2007.10) |
| *B60W 10/06* | (2006.01) |

(52) U.S. Cl.
CPC ............... *B60W 20/40* (2013.01); *B60K 6/445* (2013.01); *B60W 10/06* (2013.01); *B60W 30/18036* (2013.01); *F02N 11/0833* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 2008/0182712 A1* | 7/2008 | Kira .......................... B60K 6/26 477/7 |
| 2011/0111906 A1 | 5/2011 | Kim et al. | |
| 2011/0213525 A1* | 9/2011 | Kanemoto .......... F02N 11/0825 701/31.4 |
| 2012/0116622 A1 | 5/2012 | Kim et al. | |
| 2012/0234282 A1* | 9/2012 | Sakuma .................... B60K 6/48 123/179.25 |
| 2015/0075475 A1* | 3/2015 | Kawada .................... F01L 9/04 123/182.1 |
| 2015/0258978 A1 | 9/2015 | Shiratori | |
| 2015/0258983 A1 | 9/2015 | Kimura | |
| 2015/0258985 A1 | 9/2015 | Kimura | |
| 2015/0266461 A1 | 9/2015 | Sahashi et al. | |

FOREIGN PATENT DOCUMENTS

| | | | | |
|---|---|---|---|---|
| JP | 2005199942 | * | 7/2005 | ............ B60K 17/04 |
| JP | 2011-098712 A | | 5/2011 | |

OTHER PUBLICATIONS

Oct. 26, 2015 Office Action issued in U.S Appl. No. 14/626,002.

* cited by examiner

*Primary Examiner* — Adam Alharbi
(74) *Attorney, Agent, or Firm* — Oliff PLC

(57) ABSTRACT

The control apparatus includes a clutch release determining portion configured to detect that a clutch is placed in the released state, and an engine starting control portion configured to initiate an engine starting control to start an engine after the clutch release determining portion has detected that the clutch is placed in the released state, when the engine starting control is implemented during an output gear is rotated in a reverse direction with a torque generated by at least one of first and second electric motors MG1 and MG2. The initiation of the engine starting control after the detection of the released state of the clutch permits effective prevention of reversal of the rotating direction of the output gear from the reverse direction to the forward direction and a rise of the rotating speed of the output gear with a rise of the operating speed of the engine.

5 Claims, 5 Drawing Sheets

|  | CL2 | BK2 |
|---|---|---|
| HV1 |  | O |
| HV2 | O |  |
| EV1 |  | O |
| EV2 | O | O |

CONTROL APPARATUS FOR A HYBRID VEHICLE DRIVE SYSTEM

CROSS REFERENCE TO RELATED APPLICATION

The present application claims the priority from Japanese Patent Application No. 2014-052644 filed on Mar. 14, 2014, the disclosure of which is herein incorporated by reference in its entirety.

BACKGROUND OF THE INVENTION

1. Field of The Invention

The present invention relates to an improvement of a control apparatus for a drive system of a hybrid vehicle.

2. Description of Related Art

There is known a hybrid vehicle drive system including: a differential device which comprises a first differential mechanism and a second differential mechanism and which comprises four rotary components; an engine, a first electric motor, a second electric motor and an output rotary member which are respectively connected to said four rotary components; and a plurality of coupling elements. JP-2011-98712 A1 discloses an example of a hybrid vehicle transmission system configured to switch the hybrid vehicle drive system to a selected one of a plurality of vehicle drive modes, according to a selected one of different combinations of operating states of the coupling elements.

In the prior art hybrid vehicle drive system constructed as described above, the output rotary member is rotated in a reverse direction to drive a hybrid vehicle in a reverse direction, with an operation of the first or second electric motor in a negative direction. When the engine is started as a result of an increase of a required vehicle drive force while the hybrid vehicle is driven in the reverse direction, there is a risk of reversal of the rotating direction of the output rotary member from the reverse direction to a positive or forward direction and a rise of its rotating speed with a rise of the operating speed of the engine, depending upon a specific combination of the operating states of the coupling elements, so that the hybrid vehicle may not be adequately driven in the reverse direction. This problem was first discovered by the present inventor in the process of an intensive study in an effort to improve the performance of the hybrid vehicle.

SUMMARY OF THE INVENTION

The present invention was made in view of the background art described above. It is therefore an object of the present invention to provide a control apparatus for a hybrid vehicle drive system, which permits adequate reverse driving of the hybrid vehicle.

The object indicated above is achieved according to a first aspect of the present invention, which provides a control apparatus for a hybrid vehicle drive system including: a differential device which comprises a first differential mechanism and a second differential mechanism and which comprises four rotary components; an engine, a first electric motor, a second electric motor and an output rotary member which are respectively connected to the above-described four rotary components; and a coupling element configured to be placed in an engaged state to limit a differential function of the above-described first or second differential mechanism, the control apparatus comprising: a detecting portion configured to detect that the above-described coupling element is placed in a released state; and an engine starting control portion configured to initiate an engine starting control to start the above-described engine after the above-described detecting portion has detected that the above-described coupling element is placed in the released state, when the above-described engine starting control is implemented during the above-described output rotary member is rotated in a reverse direction with a torque generated by at least one of the above-described first and second electric motors.

According to the first aspect of the invention described above, the control apparatus comprises the detecting portion configured to detect that the above-described coupling element is placed in the released state, and the engine starting control portion configured to initiate the engine starting control to start the engine after the above-described detecting portion has detected that the above-described coupling element is placed in the released state, when the engine starting control is implemented during the above-described output rotary member is rotated in the reverse direction with the torque generated by at least one of the above-described first and second electric motors. The initiation of the engine starting control to start the engine after the detection of the released state of the coupling element permits effective prevention of reversal of the rotating direction of the output rotary member from the reverse direction to the forward direction and a rise of the rotating speed of the output rotary member with a rise of the operating speed of the engine, when the engine is started while the hybrid vehicle is driven in the reverse direction. Namely, the first present invention provides a control apparatus for a hybrid vehicle drive system, which control apparatus permits adequate reverse driving of the hybrid vehicle.

In the hybrid vehicle drive system according to a second aspect of the invention, which is controlled by the control apparatus according to the first aspect of the invention, the above-described first differential mechanism comprises a first rotary element connected to the above-described first electric motor, a second rotary element connected to the above-described engine, and a third rotary element, while the above-described second differential mechanism comprises a first rotary element, a second rotary element and a third rotary element. Further, the third rotary element of the first differential mechanism and the third rotary element of the second differential mechanism are connected to each other, and the second rotary element of the above-described second differential mechanism is connected to the above-described output rotary member, while the third rotary element of the above-described second differential mechanism is connected to the above-described second electric motor. According to this second aspect of the invention, the hybrid vehicle provided with the drive system having a practical arrangement can be adequately driven in the reverse direction.

According to a third aspect of the invention, the hybrid vehicle drive system to be controlled according to the second aspect of the invention is configured such that the above-described coupling element is a clutch configured to selectively connect the first and second rotary elements of the above-described first differential mechanism to each other. According to this third aspect of the invention, the hybrid vehicle provided with the drive system having a practical arrangement can be adequately driven in the reverse direction.

DETAILED DESCRIPTION OF PREFERRED EMBODIMENT

Figure 1:
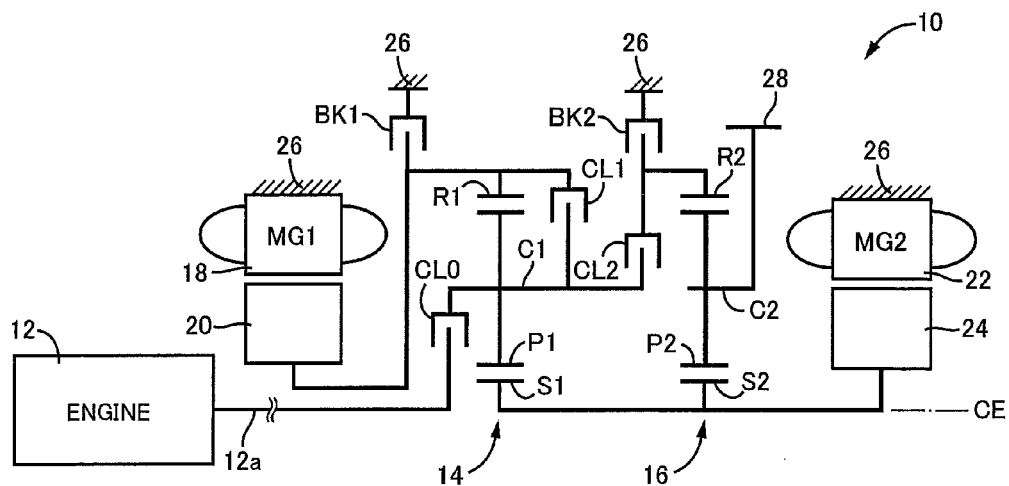
FIG. 1 is a schematic view showing an arrangement of a hybrid vehicle drive system to which the present invention is suitably applicable.

In the hybrid vehicle drive system to be controlled by the control apparatus according to the present invention, the differential device including the first differential mechanism and the second differential mechanism comprises the four rotary components when the above-described clutch disposed between a rotary element of the first differential mechanism and a rotary element of the second differential mechanisms is placed in an engaged state. Preferably, the differential device comprises the four rotary components when the clutch disposed between the second rotary element of the first differential mechanism and the first rotary element of the second differential mechanism is placed in the engaged state. In other words, the present invention is suitably applicable to a hybrid vehicle drive system including: a differential device having a first differential mechanism and a second differential mechanism and having four rotary components relative rotating speeds of which are represented along a vertical axis in a two-dimensional collinear chart in which relative gear ratios of the first and second differential mechanisms are taken along a horizontal axis; and an engine, a first electric motor, a second electric motor and an output rotary member which are respectively connected to the four rotary components, and wherein one of the four rotary components is constituted by a rotary element of the first differential mechanism and a rotary element of the second differential mechanism which are selectively connected to each other through a clutch, while one of the rotary elements of the first and second differential mechanisms which are selectively connected to each other through the clutch is selectively connected to a stationary member through a brake.

Referring to the drawings, a preferred embodiment of the present invention will be described in detail. It is to be understood that the drawings referred to below do not necessarily accurately represent ratios of dimensions of various elements.

Embodiment

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiments, the direction of extension of this axis CE will be referred to as an "axial direction". The drive system 10 is constructed substantially symmetrically with respect to the axis CE. In FIG. 1, a lower half of the drive system 10 is not shown. This applies to the other figures showing the other embodiments.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 connected to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio ρ2 and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is connected to the rotor 20 of the first electric motor MG1, and the carrier C1 is selectively connectable through a clutch CL0 to an output shaft of the engine 12 in the form of a crankshaft 12a, while the sun gear S1 is connected to the sun gear S2 of the second planetary gear set 16 and the rotor 24 of the second electric motor MG2. In the second planetary gear set 16, the carrier C2 is connected to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively connecting the ring gear R1 to the stationary member in the form of the housing 26 is disposed between the ring gear R1 and the housing 26. A brake BK2 for selectively connecting the ring gear R2 to the housing 26 is disposed between the ring gear R2 and the housing 26.

In the drive system 10 constructed as described above, the carrier C1 and the ring gear R1 of the first planetary gear set 14 are connected to each other through the clutch CL1 placed in the engaged state, so that a differential function of the first planetary gear set 14 is limited, whereby the rotary elements of the first planetary gear set 14 are rotated as a single unit by a rotary motion received from the engine 12. Further, a ratio of an output speed of the first planetary gear set 14 to a speed of the rotary motion received from the engine 12 is held constant. Namely, the clutch CL1 provided in the present embodiment corresponds to a coupling element configured to limit the differential function of the first planetary gear set 14 by being engaged. In other words, the clutch CL1 corresponds to a coupling element configured to couple the three rotary elements of the first planetary gear set 14 to each other such that the three rotary elements are rotated as a single unit.

In the drive system 10, the differential device including the first and second planetary gear sets 14 and 16 comprises four rotary components when the clutch CL2 is placed in the engaged state. In other words, the drive system 10 includes: the differential device having the first planetary gear set 14 and the second planetary gear set 16 and having the four rotary components relative rotating speeds of which are represented along a vertical axis in a two-dimensional collinear chart in which relative gear ratios of the first and second planetary gear sets 14 and 16 are taken along a horizontal axis; and the engine 12, the first electric motor MG1, the second electric motor MG2 and the output gear 28 which are respectively connected to the four rotary components, and wherein one of the four rotary components is constituted by the carrier C1 of the first planetary gear set 14 and the ring gear R2 of the second planetary gear set 16 which are selectively connected to each other through the clutch CL2, while the ring gear R2 which is selectively connected to the carrier C1 through the clutch CL2 is selectively connected to the housing 26 through the brake BK2.

In the drive system 10, the clutch CL0 is preferably placed in the engaged state during an operation of the engine 12, and in the released state according to the specific running condition of the hybrid vehicle. However, the following description is based on an assumption that the clutch CL0 is placed in the engaged state. The drive system 10 need not be provided with the clutch CL0. That is, in the absence of the clutch CL0, the crankshaft 12a of the engine 12 may be directly connected to the carrier C1 of the first planetary gear set 14, or indirectly through a damper, for instance.

Each of the clutches CL0, CL1 and CL2 (hereinafter collectively referred to as "clutches CL" unless otherwise specified), and the brakes BK1 and BK2 (hereinafter collectively referred to as "brakes BK" unless otherwise specified) is preferably a hydraulically operated coupling device the operating state of which is controlled (which is engaged and released) according to a hydraulic pressure applied thereto from a hydraulic control unit 54. While wet multiple-disc type frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from an electronic control device 30.

Figure 2:
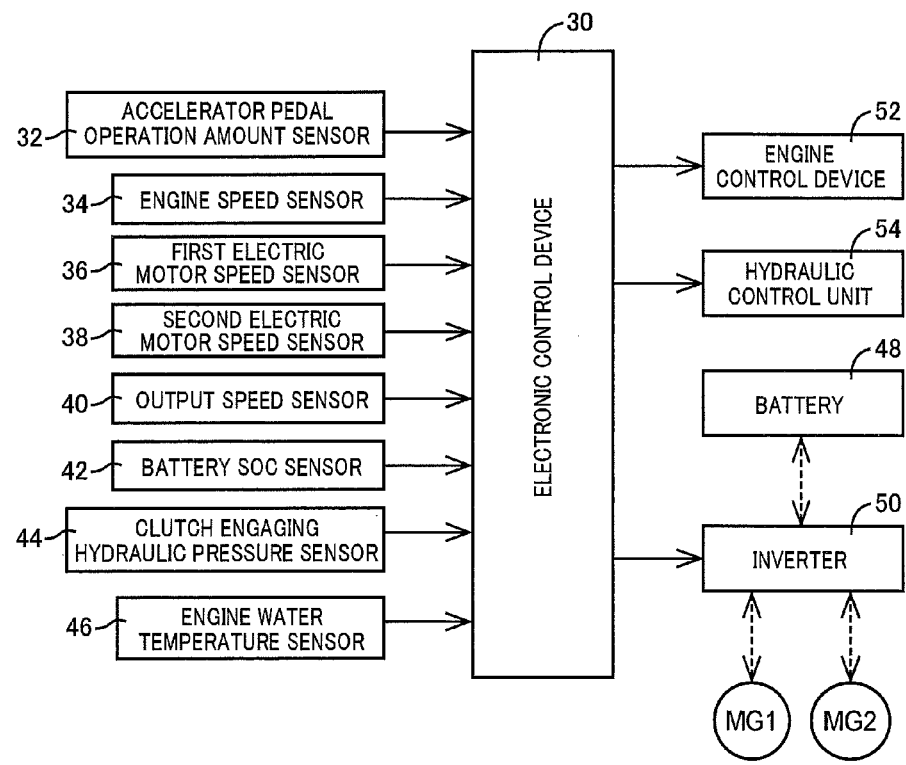
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of a first electric motor speed sensor 36 indicative of an operating speed $N_{MG1}$ of the first electric motor MG1; an output signal of a second electric motor speed sensor 38 indicative of an operating speed $N_{MG2}$ of the second electric motor MG2; an output signal of an output speed sensor 40 indicative of a rotating speed $N_{OUT}$ of the output gear 28, which corresponds to a running speed V of the hybrid vehicle; an output signal of a battery SOC sensor 42 indicative of a stored electric energy amount (state of charge) SOC of a battery 48; an output signal of a clutch engaging hydraulic pressure sensor 44 indicative of a hydraulic pressure $P_{CL1}$ to be applied to the clutch CL1; and an output signal of an engine water temperature sensor 46 indicative of a temperature $T_{ENG}$ of a cooling water for the engine 12.

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL and brakes BK, to linear solenoid valves and other electromagnetic control valves provided in the hydraulic control unit 54, so that hydraulic pressures generated by those electromagnetic control valves are controlled to control the operating states of the clutches CL and brakes BK.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
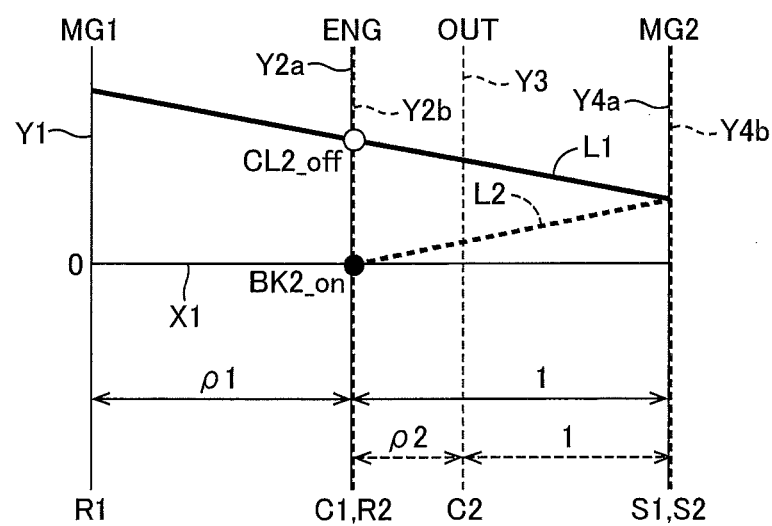
FIG. 3 is a table indicating combinations of operating states of a clutch and a brake, which correspond to respective four vehicle drive modes to be established in the drive system of FIG. 1.
FIG. 4 is a collinear chart having straight lines which permit indication thereon of relative rotating speeds of various rotary elements of the drive system of FIG. 1, the collinear chart corresponding to drive modes HV1 and EV1 indicated in FIG. 3.

In the hybrid vehicle provided with the drive system 10 constructed as described above, a selected one of a plurality of vehicle drive modes is established according to the operating states of the engine 12 and the first and second electric motors MG1 and MG2, and the operating states of the clutches CL and brakes BK. FIG. 3 is the table indicating combinations of the operating states of the clutch CL2 and brake BK2, which correspond to the respective four vehicle drive modes of the drive system 10. In this table, "o" marks represent the engaged states of the clutch CL2 and brake BK2 while blanks represent their released states. Drive modes EV1 and EV2 indicated in FIG. 3 are EV drive modes in which the engine 12 is held at rest while at least one of the first and second electric motors MG1 and MG2 is used as a vehicle drive power source. Drive modes HV1 and HV2 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 can be operated to generate a reaction force or placed in a non-loaded free state.

As indicated in FIG. 3, the drive system 10 is placed in the hybrid drive mode HV1 in the engaged state of the brake BK2 and in the released state of the clutch CL2, and placed in the hybrid drive mode HV2 in the released state of the brake BK2 and in the engaged state of the clutch CL2. Further, the drive system 10 is placed in the EV drive mode EV1 in the engaged state of the brake BK2 and in the released state of the clutch CL2, and placed in the EV drive mode EV2 in the engaged states of both of the clutch CL2 and brake BK2.

While the drive system 10 in the present embodiment is placed in one of the four different drive modes as indicated in FIG. 3, the drive system 10 may be configured to be placed in a selected one of a plurality of constant-speed-ratio drive modes, according to a selected one of different combinations of the operating states of the clutch CL1 and the brake BK1, for instance. In the constant-speed-ratio drive modes, the drive system 10 has respective different speed values of a speed ratio of a power transmitting path from the engine 12 to the output gear 28. The clutch CL1 and the brake BK1 provided in the drive system 10 are placed in the engaged or released state as needed depending upon the running condition of the hybrid vehicle provided with the drive system 10. The following description of the plurality of drive modes corresponding to the respective combinations of the operating states of the clutch CL2 and brake BK2 indicated in FIG. 3 is based on an assumption that the clutch CL1 and brake BK1 are both placed in the released states.

Figure 5:
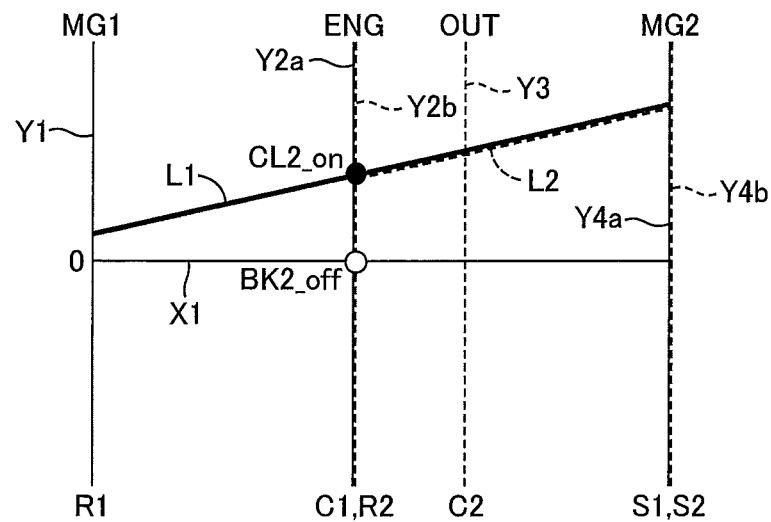
FIG. 5 is a collinear chart having straight lines which permit indication thereon of the relative rotating speeds of the rotary elements of the drive system of FIG. 1, the collinear chart corresponding to a drive mode EV2 indicated in FIG. 3.
Figure 6:
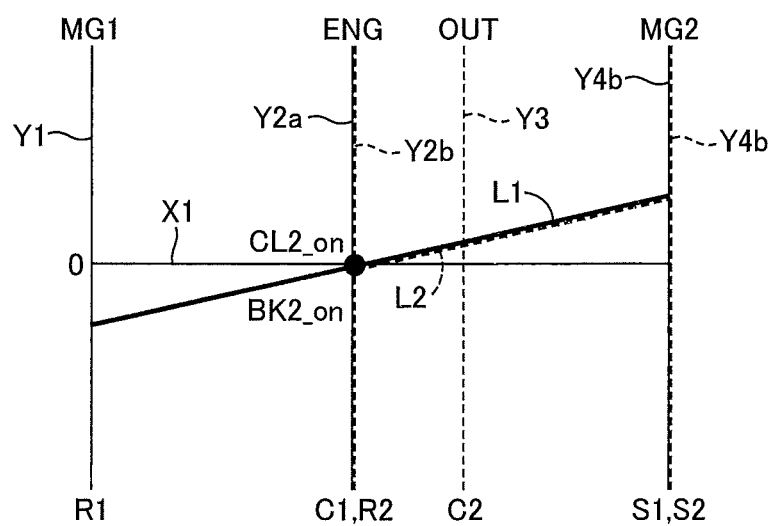
FIG. 6 is a collinear chart having straight lines which permit indication thereon of the relative rotating speeds of the rotary elements of the drive system of FIG. 1, the collinear chart corresponding to a drive mode EV2 indicated in FIG. 3.

FIGS. 4-6 are the collinear charts having straight lines which permit indication thereon of relative rotating speeds of the various rotary components of the drive system 10 (rotary elements of the first and second planetary gear sets 14 and 16), in respective different states of connection of the rotary elements corresponding to the respective different combinations of the operating states of the clutch CL2 and brake BK2. These collinear charts are defined in a two-dimensional coordinate system having a horizontal axis along which relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2a, Y2b, Y3, Y4a and Y4b arranged in the order of description in the rightward direction represent the respective relative rotating speeds of the various rotary elements. Namely, a solid line Y1 represents the rotating speed of the ring gear R1 of the first planetary gear set 14 (operating speed of the first electric motor MG1), and a solid line Y2a represents the rotating speed of the carrier C1 of the first planetary gear set 14 (operating speed of the engine 12), while a broken line Y2b represents the rotating speed of the ring gear R2 of the second planetary gear set 16. A broken line Y3 represents the rotating speed of the carrier C2 of the second planetary gear set 16 (output gear 28), and a solid line Y4a represents the rotating speed of the sun gear S1 of the first planetary gear set 14, while a broken line Y4b represents the rotating speed of the sun gear S2 of the second planetary gear set 16 (operating speed of the second electric motor MG2). In FIGS. 4-6, the vertical lines Y2a and Y2b are superimposed on each other, while the vertical lines Y4a and Y4b are superimposed on each other. Since the sun gears S1 and S2 are connected to each other, the relative rotating speeds of the sun gears S1 and S2 represented by the vertical lines Y4a and Y4b are equal to each other.

In FIGS. 4-6, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2b-Y4b) are determined by the gear ratios ρ1 and ρ2 of the first and second planetary gear sets 14 and 16. Described more specifically, regarding the vertical lines Y1, Y2a and Y4a corresponding to the respective three rotary elements of the first planetary gear set 14, a distance between the vertical lines Y2a and Y4a respectively corresponding to the carrier C1 and the sun gear S1 corresponds to "1", while a distance between the vertical lines Y1 and Y2a respectively corresponding to the ring gear R1 and the carrier C1 corresponds to the gear ratio "ρ1". Regarding the vertical lines Y2b, Y3 and Y4b corresponding to the respective three rotary elements of the second planetary gear set 16, a distance between the vertical lines Y3 and Y4b respective corresponding to the carrier C2 and the sun gear S2 corresponds to "1", while a distance between the vertical lines Y2b and Y3 respectively corresponding to the ring gear R2 and the carrier C2 corresponds to the gear ratio "ρ2". The foregoing description applies to the collinear chart of FIG. 8 referred to below. The drive modes of the drive system 10 will be described by reference to FIGS. 4-6.

The collinear chart of FIG. 4 corresponds to the drive mode HV1 of the drive system 10, which is preferably the hybrid drive mode in which the engine 12 is used as the vehicle drive power source while the first and second electric motors MG1 and MG2 are operated to generate a drive force and/or an electric energy as needed. Described by reference to this collinear chart of FIG. 4, the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is connected to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., a torque acting in a positive direction) generated by the second electric motor MG2 in the engaged state of the brake BK2.

The collinear chart of FIG. 5 corresponds to the drive mode HV2 of the drive system 10, which is preferably the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 5, the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are connected to each other, are integrally rotated as a single rotary component. Namely, in the drive mode HV2 of the drive system 10, the first and second planetary gear sets 14 and 16 function as a differential device comprising a total of four rotary components. That is, the drive mode HV2 is a composite split mode in which the four rotary components are connected to each other in the order of description in the rightward direction as seen in FIG. 5. The four rotary components consist of: the ring gear R1 (connected to the first electric motor MG1); a rotary member consisting of the carrier C1 and the ring gear R2 connected to each other (and connected to the engine 12); the carrier C2 (connected to the output gear 28); and a rotary member consisting of the sun gears S1 and S2 connected to each other (and connected to the second electric motor MG2).

In the drive mode HV2, the carrier C1 of the first planetary gear set 14 and the ring gear R2 of the second planetary gear set 16 are connected to each other in the engaged state of the clutch CL2, so that the carrier C1 and the ring gear R2 are rotated integrally with each other. Accordingly, either one or both of the first and second electric motors MG1 and MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation.

The collinear chart of FIG. 4 also corresponds to the drive mode EV1 of the drive system 10, which is preferably the EV drive mode in which the engine 12 is held at rest while the second electric motor MG2 is used as the vehicle drive power source. Described by reference to this collinear chart of FIG. 4, the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is connected to the stationary member in the form of the housing 26, so that the rotating speed of the ring gear R2 is held zero. In this drive mode EV1, the carrier C2, that is, the output gear 28 is rotated in the positive direction by a positive torque (i.e., a torque acting in a positive direction) generated by the second electric motor MG2 in the second planetary gear set 16. Namely, the hybrid vehicle provided with the drive system 10 can be driven in the forward direction with the positive torque generated by the second electric motor MG2. In this case, the first electric motor MG1 is preferably held in a free state.

The collinear chart of FIG. 6 corresponds to the drive mode EV2 of the drive system 10, which is preferably the EV drive mode in which the engine 12 is held at rest while at least one of the first and second electric motors MG1 and MG2 is used as the vehicle drive power source. Described by reference to this collinear chart of FIG. 6, the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2, are connected to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (acting in the negative direction) generated by the first electric motor MG1, and/or a positive torque (acting in the positive direction) generated by the second electric motor MG2. That is, the hybrid vehicle provided with the drive system 10 can be driven in the forward direction when the torque is generated by at least one of the first and second electric motors MG1 and MG2.

In the drive mode EV2, at least one of the first and second electric motors MG1 and MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

Figure 7:
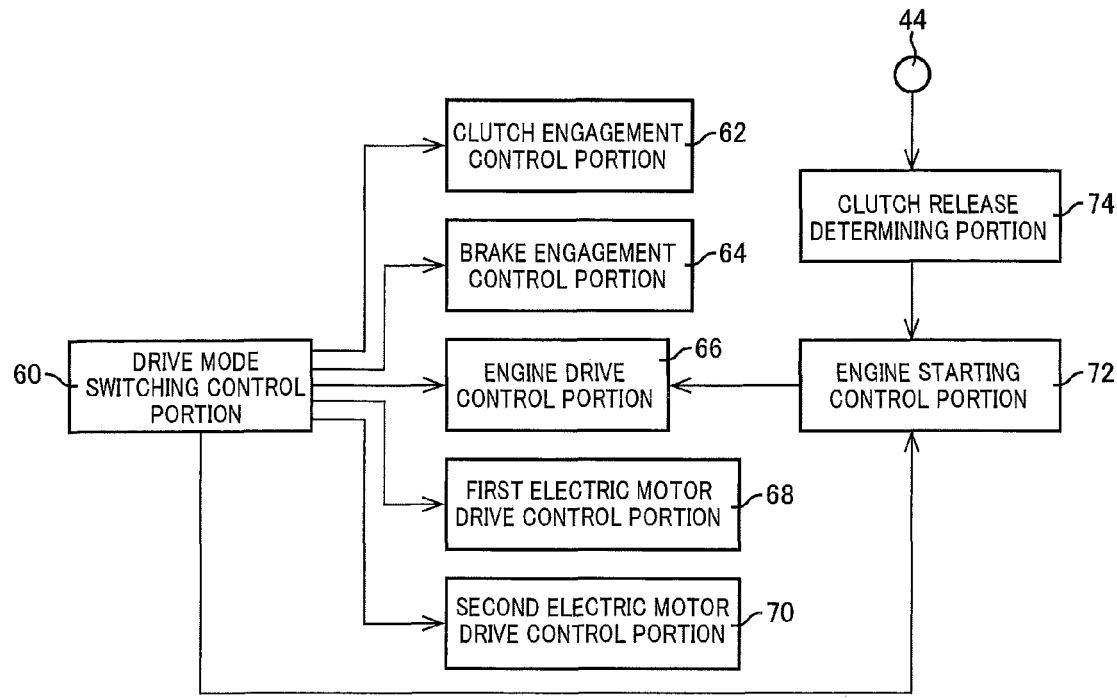
FIG. 7 is a functional block diagram illustrating major control functions of an electronic control device shown in FIG. 2.

FIG. 7 is the functional block diagram illustrating major control functions of the electronic control device 30. The electronic control device 30 includes a drive mode switching control portion 60, a clutch engagement control portion 62, a brake engagement control portion 64, an engine drive control portion 66, a first electric motor drive control portion 68, a second electric motor drive control portion 70, an engine starting control portion 72, and a clutch release determining portion 74. The drive mode switching control portion 60 shown in FIG. 7 is configured to determine the drive mode of the drive system 10 that should be established. Described more specifically, the drive mode switching control portion 60 selects one of the four drive modes indicated in FIG. 3, that is, the drive modes HV1, HV2, EV1 and EV2, on the basis of the accelerator pedal operation amount $A_{CC}$ detected by the accelerator pedal operation amount sensor 32 which corresponds to the required vehicle chive force, the vehicle running speed V corresponding to the output speed detected by the output speed sensor 40, the stored electric energy amount SOC of the battery 48 detected by the battery SOC sensor 42, etc., and according to a predetermined drive mode switching map.

The clutch engagement control portion 62 is configured to control the operating states of the clutches CL1 and CL2 through the hydraulic control unit 54. Described more specifically, the clutch engagement control portion 62 controls output hydraulic pressures of respective solenoid control valves provided in the hydraulic control unit 54 to control the clutches CL1 and CL2, for controlling the hydraulic pressures $P_{CL1}$ and $P_{CL2}$ which determine the operating states (i.e., torque capacities) of the respective clutches CL1 and CL2. The clutch engagement control portion 62 is preferably configured to control the torque capacities of the clutches CL1 and CL2, according to the drive mode selected by the drive mode switching control portion 60. The clutch engagement control portion 62 controls the torque capacity of the clutch CL2, so as to place the clutch CL2 in the engaged state when the drive mode switching control portion 60 has determined that the drive system 10 should be switched to the drive mode HV2 or EV2, and so as to place the clutch CL2 in the released state when the drive mode switching control portion 60 has determined that the drive system 10 should be switched to the drive mode HV1 or EV1. Further, the clutch engagement control portion 62 controls the torque capacity of the clutch CL1, so as to place the clutch CL1 in the released state when the drive mode switching control portion 60 has determined that the drive system 10 should be switched to one of the drive modes HV1, HV2, EV1 and EV2.

The brake engagement control portion 64 is configured to control the operating states of the brakes BK1 and BK2 through the hydraulic control unit 54. Described more specifically, the brake engagement control portion 64 controls output hydraulic pressures of solenoid control valves provided in the hydraulic control unit 54 to control the brakes BK1 and BK2, for controlling the hydraulic pressures $P_{BK1}$ and $P_{BK2}$ which determine the operating states (i.e., torque capacities) of the respective brakes BK1 and BK2. The brake engagement control portion 64 is preferably configured to control the torque capacities of the brakes BK1 and BK2, according to the drive mode selected by the drive mode switching control portion 60. Namely, the brake engagement control portion 64 controls the torque capacity of the brake BK2, so as to place the brake BK2 in the engaged state when the drive mode switching control portion 60 has determined that the drive system 10 should be switched to the drive mode HV1, EV1 or EV2, and so as to place the brake BK2 in the released state when the drive mode switching control portion 60 has determined that the drive system 10 should be switched to the drive mode HV2. The brake engagement control portion 64 controls the torque capacity of the brake BK1, so as to place the brake BK1 in the released state when the drive mode switching control portion 60 has determined that the drive system 10 should be switched to one of he drive modes HV1, HV2, EV1 and EV2.

The engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

The first electric motor drive control portion 68 is configured to control an operation of the first electric motor MG1 through the inverter 50. For example, the first electric motor drive control portion 68 controls an amount of an electric energy to be supplied from the battery 48 to the first electric motor MG1 through the inverter 50, so that the first electric motor MG1 generates a required output, that is, a target torque (target first electric motor output). The second electric motor drive control portion 70 is configured to control an operation of the second electric motor MG2 through the inverter 50. For example, the second electric motor drive control portion 70 controls an amount of an electric energy to be supplied from the battery 48 to the second electric motor MG2 through the inverter 50, so that the second electric motor MG2 generates a required output, that is, a target torque (target second electric motor output).

In the hybrid drive modes in which the engine 12 is operated while the first and second electric motors MG1 and MG2 are used as the vehicle drive power source, a required vehicle drive force to be generated by the drive system 10 (output gear 28) is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the first and second electric motor drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

The engine starting control portion 72 is configured to implement an engine starting control. That is, the engine starting control portion 72 is basically configured to command the engine control device 52 to start the engine 12 in response to an engine starting command generated while the engine 12 is held at rest. For instance, the engine starting control portion 72 implements the engine starting control to start the engine 12 upon switching of the drive system 10 by the drive mode switching control portion 60 from the EV drive mode EV1 or EV2 in which the engine 12 is held at rest, to the hybrid drive mode HV1 or HV2 in which the engine 12 is operated.

Preferably, the engine starting control portion 72 implements the engine starting control to start the engine 12, in response to the engine starting command generated while the drive system 10 is placed in the EV drive mode EV1 or EV2 in which the output gear 28 is rotated in the reverse direction with the torque generated by at least one of the first and second electric motors MG1 and MG2 while the engine 12 is held at rest. For instance, the engine starting control portion 72 implements the engine starting control when it is determined that a warm-up operation of the engine 12 is required while the cooling water temperature $T_{ENG}$ of the engine 12 detected by the engine water temperature sensor 46 is lower than a predetermined threshold value, or when the required vehicle drive force is increased, for example, when the accelerator pedal operation amount $A_{CC}$ detected by the accelerator pedal operation amount sensor 32 is equal to or larger than a predetermined threshold value, or when the chive system 10 is required to be lubricated.

The clutch release determining portion 74 is configured to determine whether the clutch CL1 is placed in the released state. For instance, the clutch release determining portion 74 determines that the clutch CL1 is placed in the released state, when the hydraulic pressure $P_{CL1}$ to be applied to the hydraulic actuator provided for the clutch CL1, which is detected by the clutch engaging hydraulic pressure sensor 44, is lower than a predetermined threshold value. In other words, the clutch release determining portion 74 determines that the clutch CL1 is not placed in the released state, when the hydraulic pressure $P_{CL1}$ detected by the clutch engaging hydraulic pressure sensor 44 is equal to or higher than the predetermined threshold value. That is, the clutch release determining portion 74 corresponds to a detecting portion configured to detect that the coupling element in the form of the clutch CL1 is placed in the released state. Alternatively, the clutch release determining portion 74 may be configured to make the above-indicated determination depending upon whether a hydraulic pressure switch which is turned on and off according to the hydraulic pressure $P_{CL1}$ is placed in the on state or the off state. In this case, the hydraulic pressure switch may function as the detecting portion. Further alternatively, the clutch release determining portion 74 may be configured to make the above-indicated determination depending upon a difference between the input and output speeds of the clutch CL1, that is, a difference between the rotating speeds of the carrier C1 and the ring gear R1 of the first planetary gear set 14.

The hybrid vehicle is driven in the reverse direction while the drive system 10 is placed in a reverse drive mode in which a reverse drive force is generated by at least one of the first and second electric motors MG1 and MG2 while both of the clutch CL1 and the brake BK1 are placed in the released state. The collinear charts of FIGS. 4 and 5 correspond to the reverse drive mode of the drive system 10 according to the present embodiment. These collinear charts indicate a state of reverse driving of the hybrid vehicle with the torque which is generated by at least one of the first and second electric motors MG1 and MG2 and which causes rotation of the output gear 28 in the reverse or negative direction. As is apparent from FIGS. 4 and 5, the differential function of the first planetary gear set 14 with respect to the rotary motion received from the engine 12 is permitted in the released state of the clutch CL1. Accordingly, a change of the operating direction of the engine 12 to the positive direction as a result of initiation of the engine starting control to start the engine 12 in the state of the collinear chart of FIG. 4 causes the first electric motor MG1 to be held in the free state, so that a rise of the operating speed of the engine 12 does not have an influence on the rotating speed of the output gear 28, preventing a problem of reversal of the rotating direction of the output gear 28 from the reverse direction to the positive or forward direction and a rise of its rotating speed with a rise of the operating speed of the engine 12.

Figure 8:
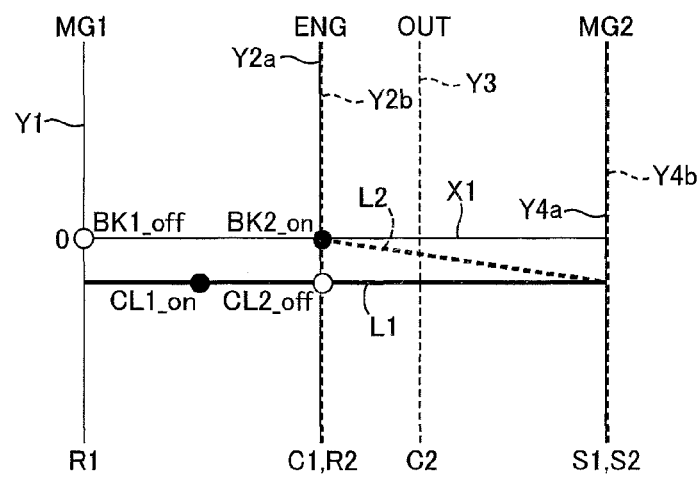
FIG. 8 is a collinear chart for explaining a problem which may be caused by the clutch placed in the engaged state upon starting of an engine while the hybrid vehicle is driven in the reverse direction in one of the EV drive modes.

FIG. 8 is the collinear chart for explaining a problem which may be caused by the clutch CL1 placed in the engaged state upon starting of the engine 12 while the hybrid vehicle is driven in the reverse direction in one of the EV drive modes. As indicated in the collinear chart of FIG. 8, the rotary elements of the first planetary gear set 14 are rotated as a single unit in the engaged state of the clutch CL1. Namely, the first electric motor MG1 connected to the ring gear R1, the engine 12 connected to the carrier C1, and the second electric motor MG2 connected to the sun gear S1 (sun gear S2) have the same operating speed. A change of the operating direction of the engine 12 to the positive direction as a result of initiation of the engine starting control to start the engine 12 in the state of the collinear chart of FIG. 8 causes the rotary elements of the first planetary gear set 14 to be rotated as a single unit, and a rise of the speed of rotation of the output gear 28 in the positive or forward direction. That is, when the engine 12 is started in the engaged state of the clutch CL1 while the output gear 28 is rotated in the reverse direction to drive the hybrid vehicle in the reverse direction with the torque generated by at least one of the first and second electric motors MG1 and MG2, there is a risk of reversal of the rotating direction of the output gear 28, so that the hybrid vehicle may not be adequately driven in the reverse direction. This risk is particularly high in the event of a failure of the clutch CL1 to be placed in the released state in spite of generation of a command to bring the clutch CL1 into the released state, namely, a failure that the clutch CL1 is kept in the engaged state.

In view of the risk described above, the engine starting control portion 72 according to the present embodiment of the invention is configured to initiate the engine starting control to start the engine 12 after the clutch release determining portion 74 has detected that the clutch CL1 is placed in the released state, when the engine starting control is implemented during the output gear 28 is rotated in the reverse direction with the torque generated by at least one of the first and second electric motors MG1 and MG2. Namely, the clutch release determining portion 74 permits the engine starting control portion 72 to initiate the engine starting control to start the engine 12 when the clutch CL1 is placed in the released state, but inhibits the engine starting control portion 72 from initiating the engine starting control in spite of generation of the command to start the engine 12, when the clutch CL1 is placed in the engaged state. In other words, the clutch release determining portion 74 permits the drive system 10 to be switched from the EV drive mode EV1 or EV2 to the hybrid drive mode HV1 or HV2 during reverse driving of the hybrid vehicle when the clutch CL1 is placed in the released state, but inhibits the drive system 10 to be switched to the hybrid drive mode HV1 or HV2 when the clutch CL1 is placed in the engaged state.

The engine starting control portion 72 is preferably configured to initiate the engine starting control upon initiation of the reverse driving of the hybrid vehicle provided with the drive system 10 with the output gear 28 being rotated in the reverse direction with the torque generated by at least one of the first and second electric motors MG1 and MG2, if the clutch release determining portion 74 has detected that the clutch CL1 is placed in the released state. That is, when the engine starting control to start the engine 12 is implemented as a result of generation of the command to start the engine 12 upon starting of the hybrid vehicle in the reverse direction with a shift lever (not shown) being operated to the reverse drive position, the engine starting control portion 72 initiates (is permitted to initiate) the engine starting control to start the engine 12 after the clutch release determining portion 74 has detected that the clutch CL1 is placed in the released state.

Figure 9:
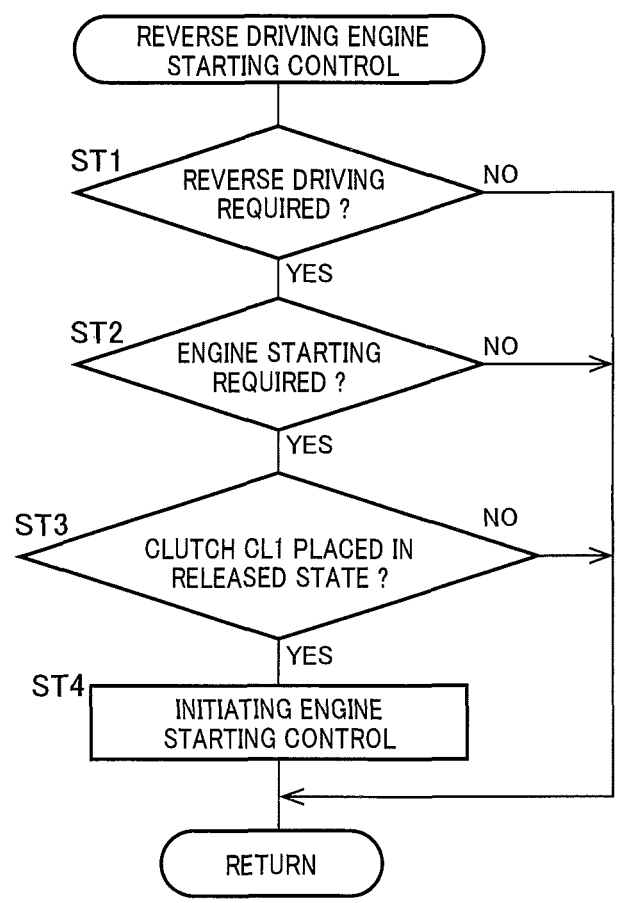
FIG. 9 is a flow chart illustrating a major portion of one example of an engine starting control implemented by the electronic control device of FIG. 2 while the hybrid vehicle is driven in the reverse direction.

FIG. 9 is the flow chart illustrating a major portion of one example of the engine starting control implemented by the electronic control device 30 while the hybrid vehicle is driven in the reverse direction. This engine starting control is implemented with a predetermined cycle time.

The engine starting control is initiated with step ST1, to determine whether the hybrid vehicle provided with the drive system 10 is required to be driven in the reverse direction with the shift lever being placed in the reverse drive position. If a negative determination is obtained in the step ST1, the present control routine is terminated. If an affirmative determination is obtained in the step ST1, the control flow goes to step ST2 to determine whether the engine 12 is required to be started as a result of drop of the cooling water temperature $T_{ENG}$ of the engine 12 (detected by the engine water temperature sensor 46) below the predetermined threshold value, for instance. If a negative determination is obtained in the step ST2, the present control routine is terminated. If an affirmative determination is obtained in the step ST2, the control flow goes to step ST3 to determine whether the coupling element in the form of the clutch CL1 disposed between the carrier C1 and the ring gear R1 of the first planetary gear set 14 is placed in the released state (i.e., not in the engaged state). This determination is made on the basis of the hydraulic pressure $P_{CL1}$ detected by the clutch engaging hydraulic pressure sensor 44. If a negative determination is obtained in the step ST3, the engine starting control to start the engine 12 is not implemented, and the present control routine is terminated. If an affirmative determination is obtained in the step ST3, the control flow goes to step S4 in which the engine starting control portion 72 commands the engine control device 52 to initiate the engine starting control to start the engine 12, and the present control routine is terminated. It will be understood that the steps ST2 and ST4 correspond to an operation of the engine starting control portion 72, while the step ST3 corresponds to an operation of the clutch release determining portion 74.

The control apparatus in the form of the electronic control device 30 according to the illustrated embodiment of the invention is provided to control the hybrid vehicle chive system including: the differential device which comprises a first differential mechanism in the form of the first planetary gear set 14 and a second differential mechanism in the form of the second planetary gear set 16 and which comprises the four rotary components (the rotating speeds of which are represented by a collinear chart); the engine 12, the first electric motor MG1, the second electric motor MG2 and an output rotary member in the form of the output gear 28 which are respectively connected to the four rotary components; and a coupling element in the form of the clutch CL1 to be placed in the engaged state to limit the differential function of the first planetary gear set 14 (the second planetary gear set 16). The electronic control device 30 comprises a detecting portion in the form of the clutch release determining portion 74 (corresponding to the step ST3) configured to detect that the clutch CL1 is placed in the released state. The electronic control device 30 further comprises the engine starting control portion 72 configured to initiate the engine starting control to start the engine 12 after the clutch release determining portion 74 has detected that the clutch CL1 is placed in the released state, when the engine starting control is implemented during the output gear 28 is rotated in the reverse direction with the torque generated by at least one of the first and second electric motors MG1 and MG2. The initiation of the engine starting control to start the engine 12 after the detection of the released state of the clutch CL1 permits effective prevention of reversal of the rotating direction of the output gear 28 from the reverse direction to the forward direction and a rise of the rotating speed of the output gear 28 with a rise of the operating speed of the engine 12, when the engine 12 is started while the hybrid vehicle is driven in the reverse direction. Namely, the illustrated embodiment provides a control apparatus in the form of the electronic control device 30 for controlling the drive system 10, which control apparatus permits adequate reverse driving of the hybrid vehicle.

The drive system 10 to be controlled by the electronic control device 30 according to the illustrated embodiment is further configured such that the first differential mechanism in the form of the first planetary gear set 14 comprises a first rotary element in the form of the ring gear R1 connected to the first electric motor MG1, a second rotary element in the form of the carrier C1 connected to the above-described engine 12, and a third rotary element in the form of the sun gear S1, while the second differential mechanism in the form of the second planetary gear set 16 comprises a first rotary element in the form of the ring gear R2, a second rotary element in the form of the carrier C2 and a third rotary element in the form of the sun gear S2. Further, the sun gear S1 of the first planetary gear set 14 and the sun gear S2 of the second planetary gear set 16 are connected to each other, and the carrier C2 of the second planetary gear set 16 is connected to the output rotary member in the form of the output gear 28, while the sun gear S2 of the second planetary gear set 16 is connected to the second electric motor MG2. Accordingly, the hybrid vehicle provided with the drive system 10 which has a practical arrangement can be adequately driven in the reverse direction.

In the drive system 10, the coupling element is the clutch CL1 configured to selectively connect the ring gear R1 and the carrier C1 of the first planetary gear set 14. Accordingly, the hybrid vehicle provided with the drive system 10 having a practical arrangement can be adequately driven in the reverse direction.

While the preferred embodiment of this invention has been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
74: Clutch release determining portion (Detecting portion)
BK2: Brake
C1: Carrier (Second rotary element)
C2: Carrier (Second rotary element)
CL1: Clutch (Coupling element)
MG1: First electric motor
MG2: Second electric motor
R1: Ring gear (First rotary element)
R2: Ring gear (First rotary element)
S1: Sun gear (Third rotary element)
S2: Sun gear (Third rotary element)

The invention claimed is:

1. A control apparatus for a hybrid vehicle drive system, the hybrid vehicle drive system comprising:
   a differential device that comprises a first differential mechanism and a second differential mechanism;
   four rotary components;
   an engine;
   a first electric motor;
   a second electric motor;
   an output rotary member, wherein each of the engine, the first electric motor, the second electric motor and the output rotary member are respectively connected to the four rotary components; and
   a coupling element configured to be placed in an engaged state to limit a differential function of: (i) at least one rotary component of the four rotary components, the at least one rotary component being connected to at least one of the first electric motor and the second electric motor; and (ii) another rotary component of the four rotary components, the other rotary component being connected to the engine; and
   the control apparatus comprising:
   a detecting portion configured to detect that the coupling element is placed in a released state; and
   an engine starting control portion configured to initiate an engine starting control to start the engine after the detecting portion has detected that the coupling element is placed in the released state, when the engine starting control is implemented while the rotary member is rotated in a reverse direction with a torque generated by at least one of the first electric motor and the second electric motor.

2. The control apparatus according to claim 1, wherein the first differential mechanism comprises a first rotary element connected to the first electric motor, a second rotary element connected to said engine, and a third rotary element;
   the second differential mechanism comprises a first rotary element, a second rotary element and a third rotary element;
   the third rotary element of the first differential mechanism and the third rotary element of the second differential mechanism are connected to each other;
   the second rotary element of the second differential mechanism is connected to the output rotary member; and
   the third rotary element of the second differential mechanism is connected to the second electric motor.

3. The control apparatus according to claim 2, wherein the coupling element is a clutch configured to selectively connect the first rotary element of the first differential mechanism and the second rotary element of the first differential mechanism to each other.

4. The control apparatus according to claim 1, wherein the coupling element is configured to engage the at least one rotary component with the other rotary component.

5. The control apparatus according to claim 4, wherein
   the differential device is constructed such that the at least one rotary component is rotated in a reverse direction when the output rotary member is rotated in the reverse direction, with the torque generated by the at least one of the first electric motor and the second electric motor; and
   the at least one rotary component is forced to be rotated in a forward direction by the other rotary component to which the at least one rotary component is engaged, when the engine is rotated with the coupling element being placed in the engaged state.

* * * * *